United States Patent [19]

Garner et al.

[11] Patent Number: 4,884,198
[45] Date of Patent: Nov. 28, 1989

[54] SINGLE CYCLE PROCESSOR/CACHE INTERFACE

[75] Inventors: Robert B. Garner, San Jose; Anant Agrawal, Cupertino, both of Calif.

[73] Assignee: Sun Microsystems, Inc., Mountain View, Calif.

[21] Appl. No.: 944,422

[22] Filed: Dec. 18, 1986

[51] Int. Cl.[4] .................... G06F 13/00; G06F 9/16
[52] U.S. Cl. ................................................ 364/200
[58] Field of Search ............... 364/200, 200 MS File, 364/900 MS File; 365/233

[56] References Cited

U.S. PATENT DOCUMENTS

| | | | |
|---|---|---|---|
| 3,984,812 | 10/1976 | Dahlberg et al. | 364/200 |
| 4,045,782 | 8/1977 | Anderson et al. | 364/200 |
| 4,079,456 | 3/1978 | Lunsford et al. | 364/200 |
| 4,087,854 | 5/1978 | Kinoshita et al. | 364/200 |
| 4,095,265 | 6/1978 | Vrba | 364/200 |
| 4,379,265 | 4/1983 | Catiller | 364/900 |
| 4,384,342 | 5/1983 | Imura et al. | 365/230 |
| 4,423,493 | 12/1983 | Annecke | 365/233 |
| 4,430,735 | 2/1984 | Catiller | 371/28 |
| 4,435,757 | 3/1984 | Pross, Jr. | 364/200 |
| 4,464,715 | 8/1984 | Stamm | 364/200 |
| 4,550,391 | 10/1985 | Chung et al. | 365/233 |
| 4,558,435 | 12/1985 | Hsieh | 365/233 |
| 4,577,293 | 3/1986 | Matick et al. | 365/189 |
| 4,599,710 | 7/1986 | Pelgrom et al. | 365/189 |
| 4,620,277 | 10/1986 | Fisher et al. | 364/200 |
| 4,628,489 | 12/1986 | Ong et al. | 365/230 |
| 4,630,239 | 12/1986 | Reed et al. | 365/230 |
| 4,631,659 | 12/1986 | Hayn, II et al. | 364/200 |
| 4,654,851 | 3/1987 | Busby | 371/28 |
| 4,663,741 | 5/1987 | Reinschmidt et al. | 365/193 |
| 4,665,509 | 5/1987 | Ooami et al. | 365/233 |
| 4,707,809 | 11/1987 | Ando | 365/189 |
| 4,712,190 | 12/1987 | Guglielmi et al. | 364/900 |
| 4,734,880 | 3/1988 | Collins | 365/233 |
| 4,794,523 | 12/1988 | Adan et al. | 364/200 |

FOREIGN PATENT DOCUMENTS

| | | | |
|---|---|---|---|
| 0100755 | 6/1983 | Japan | 364/487 |
| 0015258 | 1/1986 | Japan . | |
| 0040657 | 2/1986 | Japan . | |

Primary Examiner—Andrew J. James
Assistant Examiner—Viet Q. Nguyen
Attorney, Agent, or Firm—Blakely, Sokoloff, Taylor & Zafman

[57] ABSTRACT

An improved interface between a processor and an external cache system, having particular application for use in high speed computer systems. A cache memory for storing frequently accessed data is coupled to a cache address register (CAR). A processor generates addresses which correspond to locations of desired data in the cache, and provides these addresses to the CAR. Upon the receipt of a clock signal, the CAR couples the address to the cache memory. The processor includes a data register for receiving accessed cache data over a data bus. Data is latched into the register upon the receipt of a clock signal. Due to inherent delays associated with digital logic comprising the processor, clock signals provided by an external clock are received by the CAR prior to their receipt by the processor's data register. This delay (a fraction of a clock cycle) provides additional time to access the cache memory before the data is expected on the data bus. The CAR is fabricated out of a technology that allows it to drive the address to the large capacitive load of the cache memory in much less time than the processor itself could drive such a load. Thus, due to this buffering capability of the CAR, the cache can be much larger than what could be supported by the processor itself. The time expended sending the address from the processor to the CAR buffer, which would otherwise not be present if the processor addressed the cache directly from an internal register, does not subtract from the processor cycle time since the processor can compute the cache address and send it to the CAR in less than the time required to access the cache.

12 Claims, 3 Drawing Sheets

SINGLE CYCLE PROCESSOR/CACHE INTERFACE

BACKGROUND OF THE INVENTION

1. Field of the Invention:

The present invention relates to data processing systems utilizing cache memories, and more particularly, to microprocessor based systems utilizing an external cache; that is, a cache that is external to the integrated circuit that comprises the microprocessor.

2. Art Background:

It is common in many data processing systems to utilize a high speed buffer memory, referred to as a "cache", coupled to a central processing unit (CPU) to improve the average memory access time for the processor. The use of a cache is based upon the premise that over time, a data processing system will access certain localized areas of memory with high frequency. The cache typically contains a subset of the complete data set disposed in the main memory, and can be accessed very quickly by the CPU without the necessity of reading the data locations in the main memory.

A historic problem with cache systems is access time as a function of system clock cycles. Although cache systems are, by nature, faster than non-cache systems when the data desired is in fact located in the cache, the time required for the cache access can be significant. This is particularly true when the external cache is very large and presents a large capacitive load to the address bus of the processor. The driving of such large external, capacitive loads is a problem in many microprocessors based systems. However, such large caches are desirable since they result in fewer misses and thus faster execution of programs.

As will be described, the present invention provides an improved interface between the processor and the external cache which allows for a shorter access time and a larger cache than otherwise would be possible The present invention:

(1) utilizes inherent delays in the receipt of clock signals to provide additional time for cache access, thereby allowing for a shorter processor cycle time and a correspondent increase in the speed that the processor can execute instructions;

(2) allows the cache to be larger than it otherwise could be for short cache access times A short cycle time is achieved even though the cache presents a large capacitive load to the memory address bus of the processor.

SUMMARY OF THE INVENTION

An improved interface between a processor and an external cache system is disclosed, having particular application for use in high speed computer systems. A cache memory for storing frequently accessed data is coupled to a cache address register (CAR). A processor generates addresses which correspond to locations of desired data in the cache, and provides these addresses to the CAR. Upon the receipt of a clock signal, the CAR couples the address to the cache memory. The processor includes a data register for receiving accessed cache data over a data bus. Data is latched into the register upon the receipt of a clock signal. Due to inherent delays associated with digital logic comprising the processor, clock signals provided by an external clock are received by the CAR prior to their receipt by the processor's data register. This delay (a fraction of a clock cycle) provides additional time to access the cache memory before the data is expected on the data bus.

The CAR is fabricated out of a technology that allows it to drive the address to the large capacitive load of the cache memory in much less time than the processor itself could drive such a load. Thus, due to this buffering capability of the CAR, the cache can be much larger than what could be supported by the processor itself. The time expended sending the address from the processor to the CAR buffer, which would otherwise not be present if the processor addressed the cache directly from an internal register, does not subtract from the processor cycle time since the processor can compute the cache address and send it to the CAR in less than the time required to access the cache.

DETAILED DESCRIPTION OF THE INVENTION

An improved interface between a processor and an external cache is disclosed having particular application for use by computer systems to improve memory access efficiency. In the following description for purposes of explanation, specific memories, organizations, architectures, data rates, etc. are set forth in order to provide a thorough understanding of the present invention. However, it will be apparent to one skilled in the art, that the present invention may be practiced without these specific details. In other instances, well known circuits are shown in block diagram form in order not to obscure the present invention unnecessarily.

Figure 1:
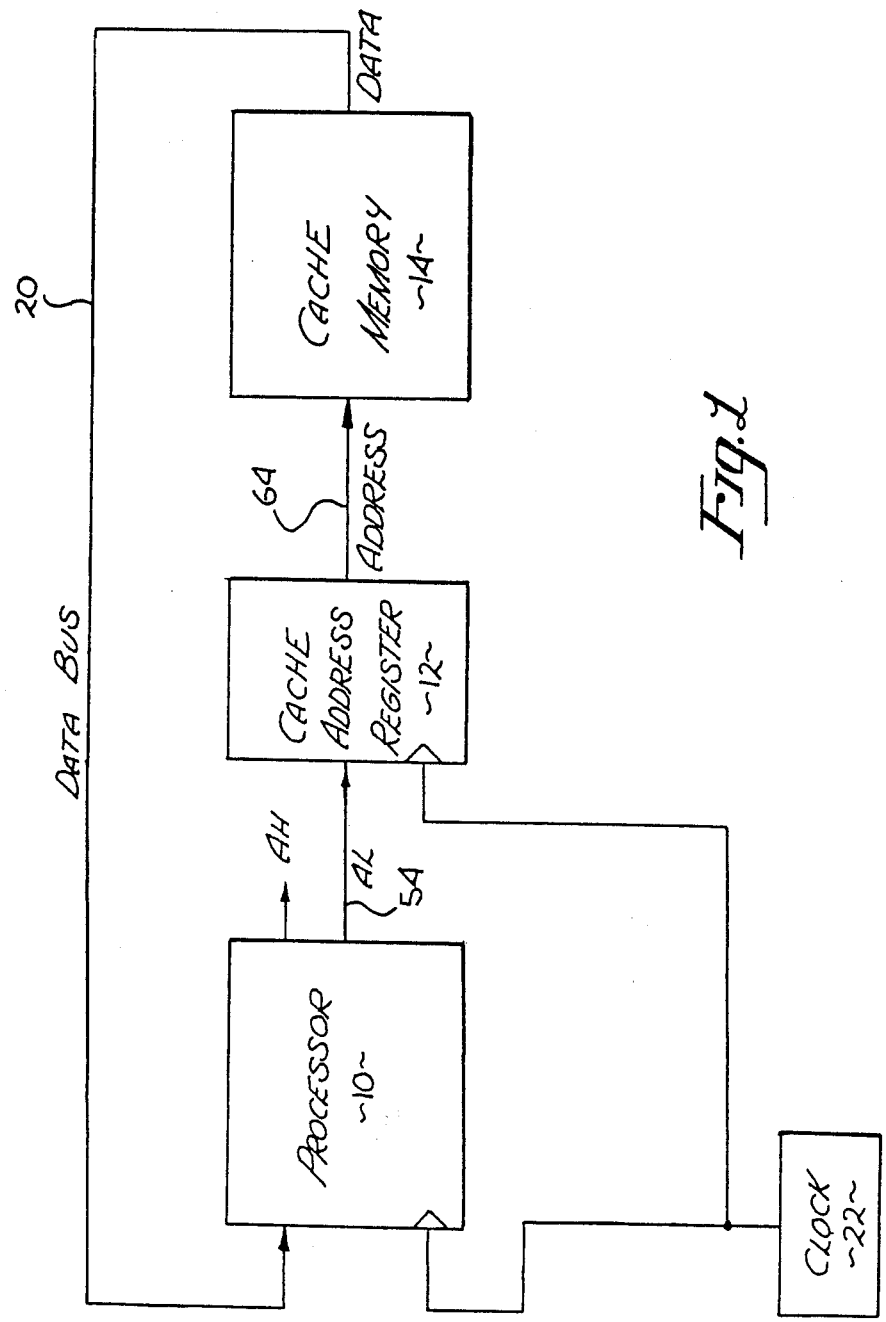
FIG. 1 is a block diagram of a data processing system utilizing the teachings of the present invention.

Referring now to FIG. 1, the system of the present invention includes a processor generally referred to by the numeral 10. A cache address register (CAR) 12 is coupled to processor 10 and a cache memory 14. Processor 10 provides an address corresponding to a location in cache memory 14 to the cache address register 12. For purposes of the Specification, the address provided by the processor 10 to the cache is referred to as the AL address. In the presently preferred embodiment of the invention, processor 10 generates the address low bits (AL bits) comprising address AL, as well as address high bits (AH bits). In the present embodiment, only the AL bits are required to reference the cache memory 14, wherein the entire address including AH and AL bits are used to determine whether the cache contains the addressed datum, and if it does not, to access a location in the main memory (not shown).

The AL address provided to CAR 12 is coupled to cache memory 14 to access the desired location in the cache memory. Data stored in the addressed memory location is then provided to processor 10 over a data bus 20, as shown in FIG. 1. An external clock 22 generates cyclical clock signals which are coupled to processor 10. As will be described, the present invention utilizes delays inherent in digital logic in order to delay the receipt of each clock signal generated by the clock 22. As illustrated in FIG. 1, clock signals generated by clock 22 are provided directly to cache address register 12 without the addition of any delay. As will be described more fully in this Specification, the present invention provides additional time for access to cache memory 14 and also provides the capability to drive a large cache memory array.

Figure 4:
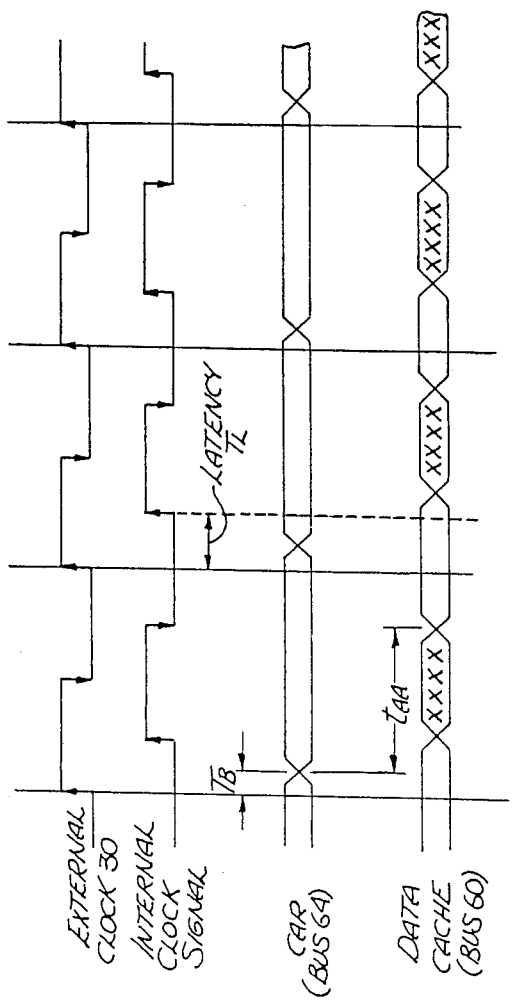
FIG. 4 is a timing diagram illustrating the present invention's use of a clock signal delay to provide additional time for cache memory access.

Referring briefly to FIG. 4, a timing diagram illustrating the sequence of events for accessing data disposed in cache memory 14 is illustrated. (Note that the signals of FIG. 4 are not illustrated to scale.) Clock 22 provides external clock signals 30 in a cyclical and systematic manner. As a result of inherent delays in the circuitry of processor 10, the external clock signals 30 reach registers internal to processor 10 after a latency period ($T_L$). Signals generated by clock 22 are provided directly to cache address register 12. The CAR, in the present embodiment, is fabricated using a technology which allows it to rapidly drive its signals onto the large capacitive load of the cache memory system. However, as a result of inherent line delays, those signals are delayed a finite time ($T_B$) (which in the present embodiment comprises approximately 14 ns). Due to the present invention's predetermined delay of clock signals to registers internal to processor 10, the clock signals generated by the clock 22 are received by CAR 12 prior to their receipt by registers internal to the processor 10.

The delayed clock signals reaching registers internal to processor 10 result in the processor delaying its anticipated reception of data from cache memory 14. Accordingly, it will be appreciated by one skilled in the art, that the present invention provides additional time approximately equal to $T_L$ for access to cache memory 14 prior to the anticipated receipt of the data by processor 10. Furthermore, it will be noted that CAR 12 acts as a buffer since it can drive many cache memory chips over bus 64 more rapidly than the processor can (over bus 54) (presently, approximately 14 ns for CAR 12 versus approximately 30 ns for the processor).

Since the processor 10 can generate AL and distribute it to the CAR 12 over bus 54 in less than the cache access time (defined below), it will be appreciated by one skilled in the art that the present invention provides a buffering capability in CAR with no impact on the processor cycle time, and without the need for artificially induced delays in the clock and thus allows for a larger cache than would otherwise be possible. The "cache access time" may be defined as the time required to present an address in the CAR to the cache memory chips read the data from the cache and latch the read data inside the processor. In addition, the "processor cycle time" is the time required for processor to do an internal calculation between two successive edges of a clock signal.

Figure 2:
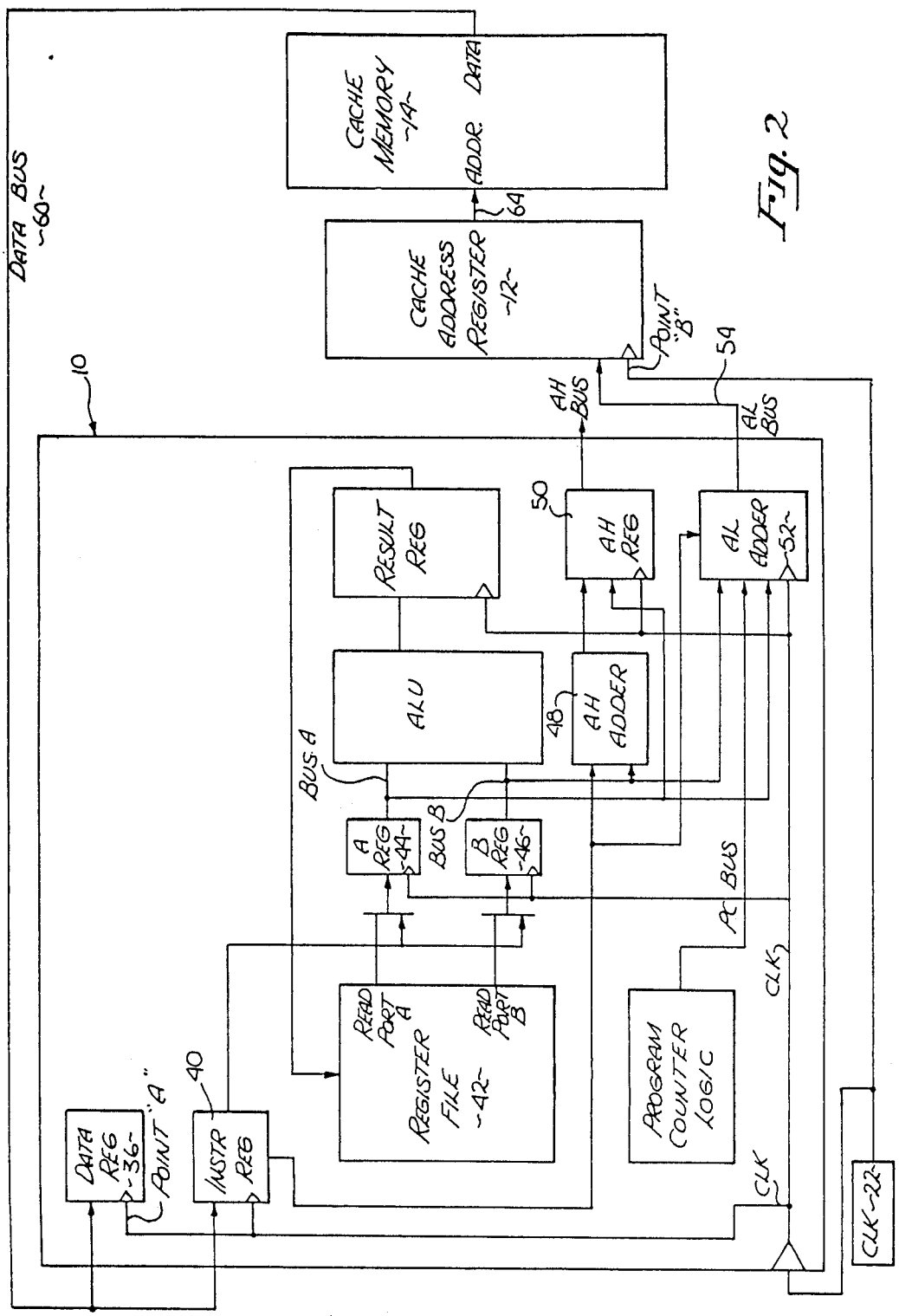
FIG. 2 is a more detailed block diagram of a data processing system utilizing the teachings of the present invention.
Figure 3:
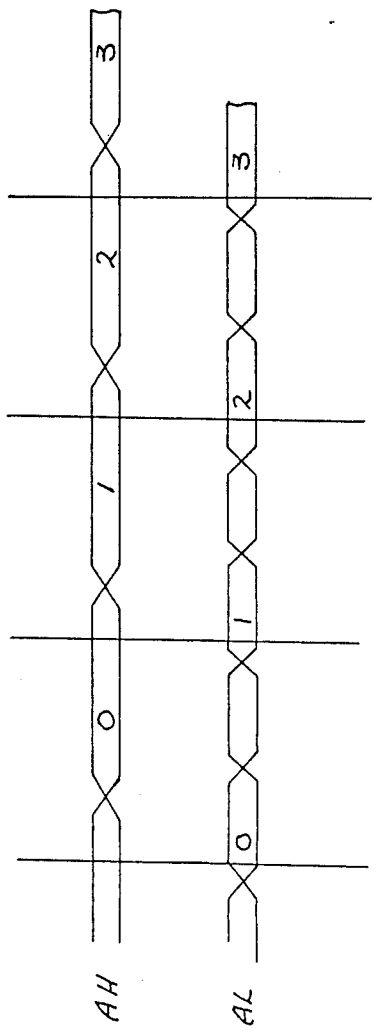
FIG. 3 is a timing diagram illustrating the generation of address high (AH) and address low (AL) signals.

Referring now to FIG. 2, the operation of the present invention will be described more fully with reference to the presently preferred embodiment. In the presently preferred embodiment, the inherent delay associated with the digital hardware comprising processor 10 provides the desired delay for operation of the present invention as previously discussed with refrence to FIG. 1. The clock signals generated by clock 22 arrive at point "B" prior to their arrival at point "A" shown in FIG. 2. As a result, the cache address register 12 is clocked to provide the AL address to cache memory 14, prior to the clocking of data register 36 to receive the cache data. Assume for sake of example, that processor 10 has a load/store data instruction in the instruction register 40 (see FIG. 2). In a typical generation of AL and AH addresses, upon receipt of a clock signal, instruction register 40 reads two operands from the register file 42 (one operand for read port A and one operand for read port B), as specified by the particular instructions stored within instruction register 40. The operands are provided, respectively, to A register 44 and B register 46. On the next clock signal from clock 22, A register 44 drives bus A, and B register 46 drives bus B, such that the AH adder 48 adds the contents of bus A to bus B and applies the result to an AH register 50. Address AH represents the high order bits of the total address provided by processor 10 for access to main memory (not shown). Concurrently, AL adder 52 adds the contents of bus A to the contents of bus B, and this result is outputted on the AL bus 54 and represents the AL address (which are defined as the low order bits of the complete 32 bit address). As previously described, for purposes of addressing cache memory 14, only the AL bits (low bits) are required. It should be noted that only one adder is necessary if, in the particular implementation of the present invention, the AH adder can generate its result as rapidly as the AL adder.

The AL bits are then applied over the AL bus 54 to the cache address register 12 and are provided to cache memory 14 upon the receipt of the next clock signal from clock 22. On this next clock signal, address AL is supplied to cache memory 14 and the cache 14 supplies data at the specified address to data bus 60. The data is transmitted over bus 60 to the data register 36 It will be appreciated by one skilled in the art, that due to the structure and organization of the present invention, the same clock signal originating from clock 22 which clocks the AL address from the cache address register 12 to cache memory 14 also, after an appropriate delay $T_L$, clocks the access data into data register 36. Accordingly, the delay in the clock signal reaching point A (data register 36) provides additional time for access to cache memory 14, without the need for introducing additional artificial delay in the clock signal reaching point A, thereby permiting a faster single cycle access.

It will be appreciated that the time required to drive a signal over bus 54 to the CAR 12 (or to the non-latching buffer if the cache adress register is a part of the processor) has been removed from the cycle time required to access the cache, and has been transferred into the cycle time required to generate AL. For one skilled in the art, it is clear that the processor can be designed so that the time required to generate AL is small compared to the cache access time. Moreover, although the CAR may be disposed inside processor 10, such that the CAR is coupled to the cache through a buffer, this architecture requires the use of an artificially induced delay. It has been found that the use of an artifical delay applied to the clock signal results in generally unsatisfactory performance. Since the input capacitance of the buffer varies from one part to another, the exact delay can only be determined empirically. In addition, the delay varies as a result of ambient temperature and applied power. Thus, although an artificial delay would theoretically be satisfactory, the Applicant has not found them practical in most applications.

It will further be noted by one skilled in the art, that although certain specified circuits and electronic block diagrams are illustrated as comprising processor 10, that numerous other data paths, electrical blocks, etc. are disposed within processor 10. However, the organization and structure of processor 10 has been illustrated in this simplified manner in order to convey the operation of the present invention without unnecessary detail.

Accordingly, an improved single cycle external cache system has been disclosed. Although the present invention has been described with particular reference to FIGS. 1-4, it will be apparent to one skilled in the art that the teachings of the present invention may be used in a variety of other computer memory applications.

We claim:

1. A cache access system external to a processor comprising:
   cache memory means including a cache memory for storing data at a plurality of addresses;
   cache register means coupled to said cache memory means for temporarily storing an address to be applied to said cache memory on receipt of a clock signal by said cache register means;
   address generation means coupled to said cache register means for generating said address and providing said address to said cache register means;
   clock means for generating cyclical clock signals coupled to said cache register means and said dddress generation means;
   cache data receiving means, internal to the processor, coupled to said cache memory means and said clock means for receiving said accessed data on receipt of said clock signal;
   wherein said cache register means has a first inherent delay of said clock signal and said cache data receiving means has a second inherent delay of said clock signal which is longer than said first inherent delay a fraction of a clock cycle, such that said clock signal is received by said cache data receiving means after receipt of said clock signal by said cache register means;
   whereby said fraction of a clock cycle provides additional time for accessing said cache memory means prior to the receipt of said clock signals by said cache data receiving means.

2. The external cache access system as defined by claim 1, wherein said cache memory means, cache register means, address generation means, and cache data receiving means are comprised of digital solid state logic devices.

3. The external cache access system as defined by claim 2, wherein said cache register means comprises a register.

4. The external cache access system as defined by claim 3, wherein said address generated by said address generation means includes a high address (AH) and a low address (AL) wherein said AL address is applied to said cache register means.

5. The external cache access system as defined by claim 4, wherein said cache register means is capable of driving a larger capacitive load than said address generation means, thereby permitting a larger cache memory than if said cache memory is driven by said address generation means.

6. The external cache access system as defined by claim 5, wherein said cache data receiving means includes a data register.

7. The external cache access system as defined by claim 6, wherein said address generation means and said cache data receiving means comprise a portion of a microprocessor.

8. A cache access system, comprising:
   an external cache memory for storing data at a plurality of addresses;
   clock means for generating cyclical clock signals;
   a cache address register coupled to said external cache memory and said clock means for temporarily storing an address to be provided to said cache memory to access desired data, said address being applied to said external cache memory by said cache address register upon receipt of a clock signal from said clock means;
   processing means coupled to said clock means, said cache address register and said external cache memory, for generating said address and providing said address to said cache address register, said processing means further including receiving means for receiving data accessed in said external cache memory on receipt of said clock signal, wherein said cache address register has a first inherent delay of said clock signal and said receiving means has a second inherent delay of said clock signal which is longer than said first inherent delay by a fraction of a clock cycle such that said clock signals are received by said cache address register prior to receipt of said clock signals by said receiving means, thereby providing additional time for accessing said cache memory.

9. The cache access system as defined by claim 8, wherein said cache register means comprises a register.

10. The cache access system as defined by claim 9, wherein said address generated by said address generation means includes a high address (AH) and a low address (AL) wherein said AL address is applied to said cache register means.

11. The cache access system as defined by claim 9, wherein said cache data receiving means includes a data register.

12. The cache access system as defined by claim 11, wherein said cache address register is capable of driving a larger capacitive load then said processing means, thereby permitting a larger external cache memory than if said cache memory is driven directly by said processing means.

* * * * *